US009639193B2

United States Patent
Yang

(10) Patent No.: US 9,639,193 B2
(45) Date of Patent: *May 2, 2017

(54) TOUCH-CONTROL PIXEL DRIVING CIRCUIT, TOUCH-CONTROL PIXEL DRIVING METHOD, ARRAY SUBSTRATE AND LIQUID CRYSTAL DISPLAY (LCD) DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Shengji Yang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/344,538

(22) PCT Filed: May 31, 2013

(86) PCT No.: PCT/CN2013/076596
§ 371 (c)(1),
(2) Date: Mar. 12, 2014

(87) PCT Pub. No.: WO2014/172958
PCT Pub. Date: Oct. 30, 2014

(65) Prior Publication Data
US 2014/0320439 A1    Oct. 30, 2014

(30) Foreign Application Priority Data

Apr. 25, 2013   (CN) .......................... 2013 1 0147016

(51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G06F 3/044* (2013.01); *G02F 1/133555* (2013.01)

(58) Field of Classification Search
CPC ........................................... G06F 3/041–3/047
(Continued)

(56) References Cited

U.S. PATENT DOCUMENTS

2003/0076295 A1    4/2003  Nakajima
2004/0085284 A1 *  5/2004  Chen et al. ................... 345/100
(Continued)

FOREIGN PATENT DOCUMENTS

CN    101581845 A    11/2009
CN    103034365 A    4/2013
(Continued)

OTHER PUBLICATIONS

Extended European Search Report dated Nov. 2, 2004 Appln. No. 13195481.04-1903.
(Continued)

*Primary Examiner* — Temesghen Ghebretinsae
*Assistant Examiner* — Hang Lin
(74) *Attorney, Agent, or Firm* — Ladas & Parry LLP

(57)    ABSTRACT

A touch-control pixel driving circuit, a touch-control pixel driving method, an array substrate and a liquid crystal display (LCD) device are provided and involve LCD field, the arrangement of additional driving electrodes and sensing electrodes can be avoided, and the manufacturing process can be simplified, and consequently the costs can be reduced. The touch-control pixel driving circuit comprises a (Continued)

pixel electrode (3), a transmissive common electrode (1), a reflective common electrode (2), a gate line (G1), a reset signal line (G2), a reset control line (G3), a read control line (G4), a dual-purpose data line (G5), a first switching transistor (M1), a second switching transistor (M2), an amplifying transistor (T) and a third switching transistor (M3). Of the first switching transistor (M1), a first end is connected to the pixel electrode (3), a second end is connected to the dual-purpose data line (G5), and a control end is connected to the gate line (G1). Of the second switching transistor (M2), a first end is connected to the reflective common electrode (2), a second end is connected to the reset signal line (G2), and a control end is connected to the reset control line (G3). Of the amplifying transistor (T), a first end is connected to the reset signal line (G2) (G2), and a control end is connected to the reflective common electrode (2). Of the third switching transistor (M3), a first end is connected to a second end of the amplifying transistor (T), a second end is connected to the dual-purpose data line (G5), and a control end is connected to the read data line (G4).

1 Claim, 3 Drawing Sheets

(51) Int. Cl.
  *G06F 3/044*     (2006.01)
  *G02F 1/1335*    (2006.01)

(58) Field of Classification Search
  USPC ............................. 345/173, 90, 92; 349/12
  See application file for complete search history.

(56) References Cited

U.S. PATENT DOCUMENTS

| | | | |
|---|---|---|---|
| 2004/0113877 | A1 | 6/2004 | Abileah et al. |
| 2006/0267891 | A1 | 11/2006 | Nishimura et al. |
| 2007/0170462 | A1* | 7/2007 | Hsu et al. .................. 257/187 |
| 2008/0018612 | A1 | 1/2008 | Nakamura et al. |
| 2009/0200088 | A1 | 8/2009 | Chuang |
| 2009/0262286 | A1* | 10/2009 | Nishida .................. 349/114 |
| 2009/0284270 | A1 | 11/2009 | Ota |
| 2009/0284492 | A1 | 11/2009 | Chino |
| 2009/0295692 | A1* | 12/2009 | Lee et al. .................. 345/87 |
| 2010/0156819 | A1* | 6/2010 | Takahashi et al. ........... 345/173 |
| 2011/0096026 | A1* | 4/2011 | Fann et al. .................. 345/174 |
| 2011/0193816 | A1 | 8/2011 | Kitakado |
| 2011/0273397 | A1 | 11/2011 | Hanari |
| 2012/0044176 | A1* | 2/2012 | Nakamura ........... G06F 3/0412 345/173 |
| 2012/0268396 | A1 | 10/2012 | Kim et al. |
| 2014/0168157 | A1* | 6/2014 | Yang .................. 345/174 |

FOREIGN PATENT DOCUMENTS

| | | | |
|---|---|---|---|
| CN | 203178628 | U | 9/2013 |
| EP | 2045655 | A1 | 4/2009 |
| JP | 2002-152545 | A | 6/2002 |
| JP | 2004-157537 | A | 6/2004 |
| JP | 2006-040289 | A | 2/2006 |
| JP | 2008-027292 | A | 2/2008 |
| JP | 2009-031819 | A | 2/2009 |
| JP | 2010-039380 | A | 2/2010 |
| JP | 2011-197685 | A | 10/2011 |
| JP | 2012-043201 | A | 3/2012 |
| KR | 20120119369 | A | 10/2012 |
| KR | 20120121835 | A | 11/2012 |

OTHER PUBLICATIONS

Korean Notice of Preliminary Rejection dated Dec. 10, 2014; Appln. No. 10-2013-0153986.
First Chinese Office Action issued Jan. 27, 2015; Appln. No. 201210540574.9.
EPO Communication dated Nov. 9, 2015; Appln. No. 13 195 481.0-1903.
USPTO NFOA mailed May 21, 2015 in connection with U.S. Appl. No. 14/106,608.
International Preliminary Report on Patentability issued Oct. 27, 2015; PCT/CN2013/076596.
Korean Notice of Allowance Appln. No. 10-2014-7008783; Dated Jan. 30, 2016.
International Search Report (Chinese language), for International Application No. PCT/CN2013/076596, 14 pgs.
English abstract of CN203178628U.
Extended European Search Report dated Nov. 14, 2016; Appln. No. 13834285.2-1903/2991068 PCT/CN2013076596.
First Japanese Office Action dated Jan. 30, 2017; Appln. No. 2016-509255.

* cited by examiner

TOUCH-CONTROL PIXEL DRIVING CIRCUIT, TOUCH-CONTROL PIXEL DRIVING METHOD, ARRAY SUBSTRATE AND LIQUID CRYSTAL DISPLAY (LCD) DEVICE

CROSS REFERENCE TO RELATED APPLICATIONS

This application is based on International Application No. PCT/CN2013/076596 filed on May 31, 2013, which claims priority to Chinese National Application No. 201310147016.0 filed on Apr. 25, 2013. The entire contents of each and every foregoing application are incorporated herein by reference.

TECHNICAL FIELD

Embodiments of the present invention relate to a touch-control pixel driving circuit, a touch-control pixel driving method, an array substrate and a liquid crystal display (LCD) device.

BACKGROUND

With the development of the touch display technology, the in-cell touch technology has been more and more widely applied. By adoption of the in-cell touch technology, a screen can be designed thinner and lighter. Moreover, touch-control elements are integrated into a display panel, so that the panel inherently has the touch function, and hence there is no need to bond and assemble a touch panel and the display panel together any more. However, because additional touch-control elements, for instance, driving electrodes and sensing electrodes, must be disposed in the display panel in the current in-cell touch technology, additional manufacturing processes are required, and hence the costs can be increased.

SUMMARY

Embodiments of the present invention provide a touch-control pixel driving circuit, a touch-control pixel driving method, an array substrate and an LCD device, in which additional driving electrodes and sensing electrodes are not required, so that the manufacturing process can be simplified, and hence the manufacturing cost can be reduced.

In one aspect, the present invention provides a touch-control pixel driving circuit adapted to a transflective display device, which comprises: a pixel electrode, a transmissive common electrode, a reflective common electrode, a gate line, a reset signal line, a reset control line, a read control line, a dual-purpose data line, a first switching transistor, a second switching transistor, an amplifying transistor, a third switching transistor and a coupling capacitor, wherein a first end of the first switching transistor is connected to the pixel electrode; a second end of the first switching transistor is connected to the dual-purpose data line; a control end of the first switching transistor is connected to the gate line; a first end of the second switching transistor is connected to the reflective common electrode; a second end of the second switching transistor is connected to the reset signal line; a control end of the second switching transistor is connected to the reset control line; a first end of the amplifying transistor is connected to the reset signal line; a control end of the amplifying transistor is connected to the reflective common electrode; a first end of the third switching transistor is connected to a second end of the amplifying transistor; a second end of the third switching transistor is connected to the dual-purpose data line; a control end of the third switching transistor is connected to the read control line; and both ends of the coupling transistor are respectively connected to the reflective common electrode and the reset signal line. Moreover, the amplifying transistor is a P-type transistor.

In the touch-control pixel driving circuit, for instance, the first switching transistor, the second switching transistor, the amplifying transistor and the third switching transistor are manufactured by the low temperature polysilicon (LTPS) technology.

In the touch-control pixel driving circuit, for instance, the pixel electrode is isolated from and overlapped with the transmissive common electrode and the reflective common electrode.

In another aspect, the present invention provides an array substrate adapted to a transflective display device, which comprises a plurality of pixel units distributed in a matrix, wherein each pixel unit includes a pixel electrode and a transmissive common electrode and a reflective common electrode which are disposed below the pixel electrode; a plurality of the pixel units include display pixel units and touch-control pixel units; and each touch-control pixel unit includes the foregoing touch-control pixel driving circuit.

In the array substrate, for instance, touch-control pixels are blue pixels.

In the array substrate, for instance, a first insulating layer is disposed on the array substrate; the reflective common electrode is disposed on the first insulating layer; a second insulating layer is disposed on the reflective common electrode; the transmissive common electrode is disposed on the second insulating layer; a third insulating layer is disposed on the transmissive common electrode; and the pixel electrode is disposed on the third insulating layer.

In another aspect, the present invention provides an LCD device, which comprises the foregoing array substrate.

In still another aspect, the present invention provides a touch-control pixel driving method applied to the foregoing touch-control pixel driving circuit, which comprises: a first stage, in which the gate line provides an ON signal to switch on the first switching transistor; the dual-purpose data line provides a data signal to the pixel electrode via the first switching transistor; the reset control line provides an ON signal to switch on the second switching transistor; the reset signal line provides a common electrode voltage to the reflective common electrode via the second switching transistor; and the read control line provides an OFF signal to switch off the third switching transistor; and a second stage, in which the gate line provides an OFF signal to switch off the first switching transistor; the reset control line provides an OFF signal to switch off the second switching transistor; the read control line provides an ON signal to switch on the third switching transistor; and when the reflective common electrode detects finger touch, a voltage of the reflective common electrode is reduced in such a way that the amplifying transistor is switched on, and the common electrode voltage provided by the reset signal line is amplified into a touch signal by the amplifying transistor and provided to the dual-purpose data line via the third switching transistor.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

Figure 1:
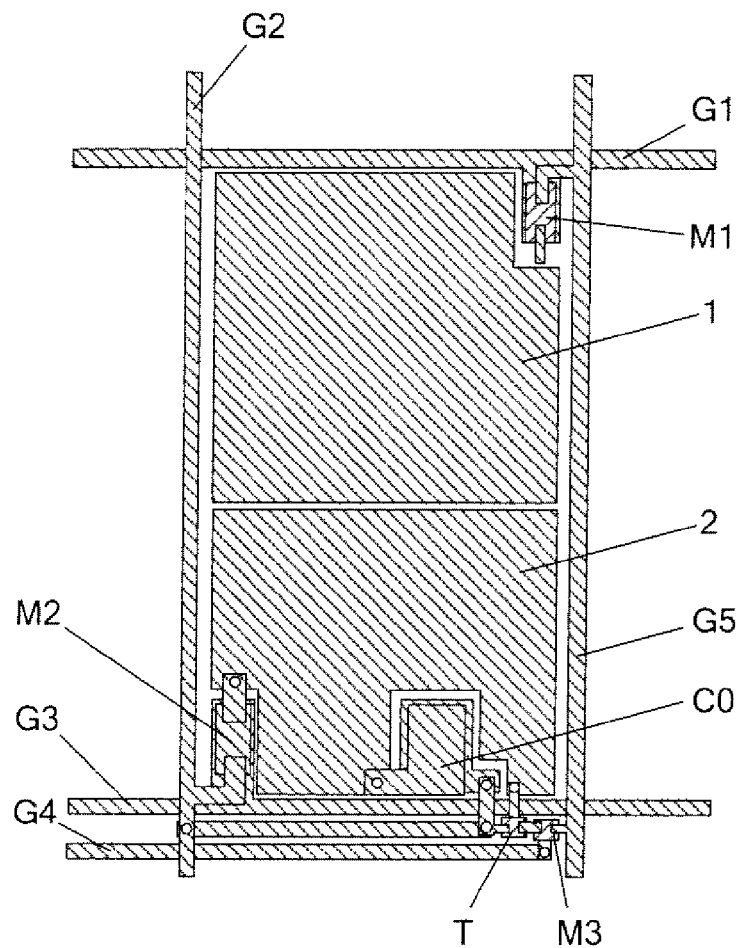
FIG. 1 is a schematic structural view of a touch-control pixel in the embodiment of the present invention.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by a person of ordinary skill in the art to which the present invention belongs. The terms "first," "second," and the like, which are used in the description and the claims of the present application for invention, are not intended to indicate any sequence, amount or importance, but distinguish various components. Also, the terms such as "a," "an," and the like, are not intended to limit the amount, but indicate the existence of at lease one. The terms "comprise," "comprising," "include," "including," and the like, are intended to specify that the elements or the objects stated before these terms encompass the elements or the objects and equivalents thereof listed after these terms, but do not preclude the other elements or objects. The terms "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The advanced super dimension switch (ADS) technology involves that: multi-dimensional electric fields are formed by electric fields produced by edges of slit electrodes on the same plane and electric fields produced between the slit electrodes and plate electrodes, so that liquid crystal molecules can rotate, and hence the working efficiency of liquid crystals can be improved and the light transmittance can be increased. The transflective display technology involves that: each pixel is divided into a reflective region and a transmissive region, so that the display function can be achieved by the light of a backlight and by the reflected external light as well, and hence good display effect can be achieved no matter in the weak-light state, the non-luminous state or the external intense-light state.

The embodiments of the present invention provide a new touch-control pixel driving circuit, a touch-control pixel driving method, an array substrate and an LCD device on the basis of the ADS technology and the transflective display technology.

As illustrated in FIG. 1 to FIG. 4, an embodiment of the present invention provides a touch-control pixel driving circuit adapted to a transflective display device, which comprises: a pixel electrode 3 (not shown in FIG. 1), a transmissive common electrode 1, a reflective common electrode 2, a gate line G1, a reset signal line G2, a reset control line G3, a read control line G4, a dual-purpose data line G5, a first switching transistor M1, a second switching transistor M2, an amplifying transistor T, a third switching transistor M3 and a coupling capacitor C0, wherein a first end of the first switching transistor M1 is connected to the pixel electrode; a second end of the first switching transistor M1 is connected to the dual-purpose data line G5; a control end of the first switching transistor M1 is connected to the gate line G1; a first end of the second switching transistor M2 is connected to the reflective common electrode 2; a second end of the second switching transistor M2 is connected to the reset signal line G2; a control end of the second switching transistor M2 is connected to the reset control line G3; a first end of the amplifying transistor T is connected to the reset signal line G2; a control end of the amplifying transistor T is connected to the reflective common electrode 2; a first end of the third switching transistor M3 is connected to a second end of the amplifying transistor T; a second end of the third switching transistor M3 is connected to the dual-purpose data line G5; a control end of the third switching transistor M3 is connected to the read control line G4; and both ends of the coupling capacitor C0 are respectively connected to the reflective common electrode 2 and the reset signal line G2. Herein, the amplifying transistor T is a P-type transistor.

Figure 2:
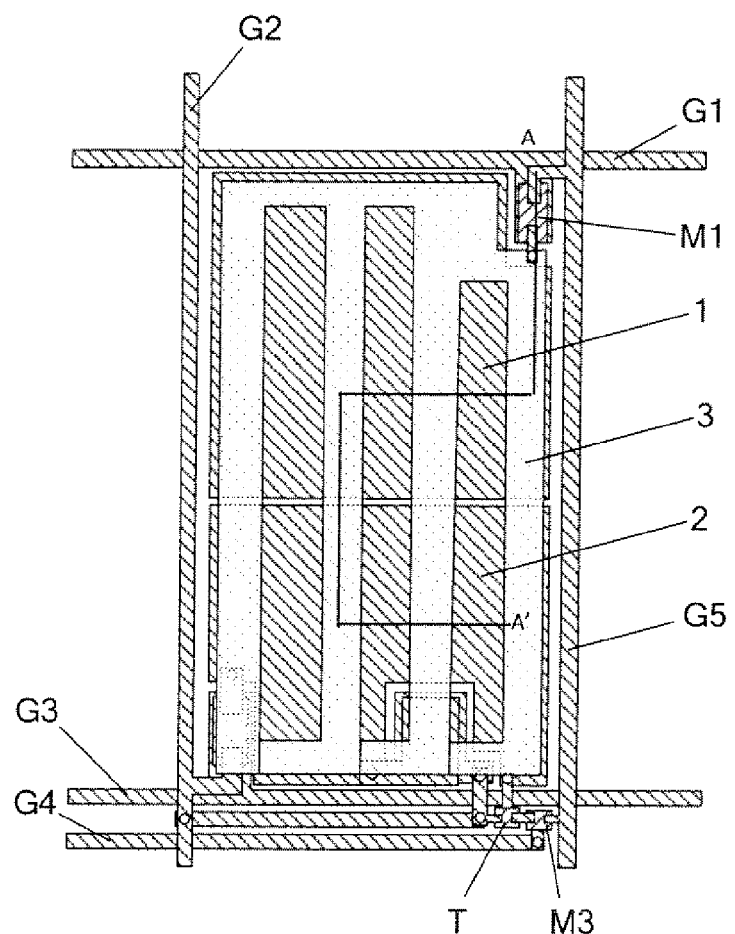
FIG. 2 is a schematic structural view of the touch-control pixel as shown in FIG. 1 including a pixel electrode.
Figure 3:
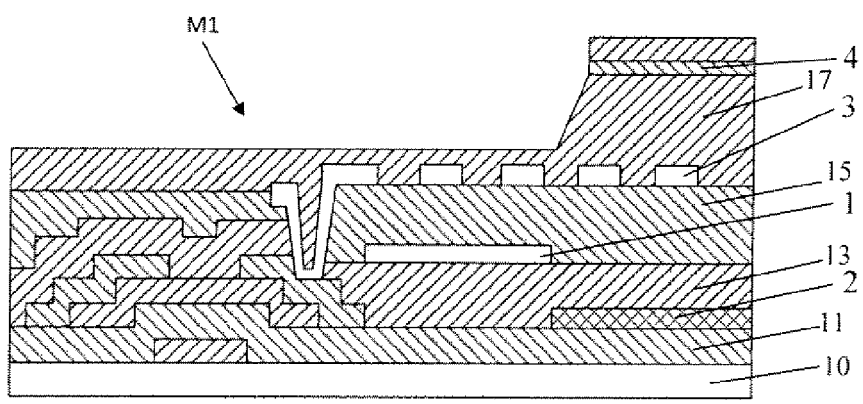
FIG. 3 is a sectional view of a touch-control pixel structure as shown in FIG. 2 along the A-A' direction.
Figure 4:
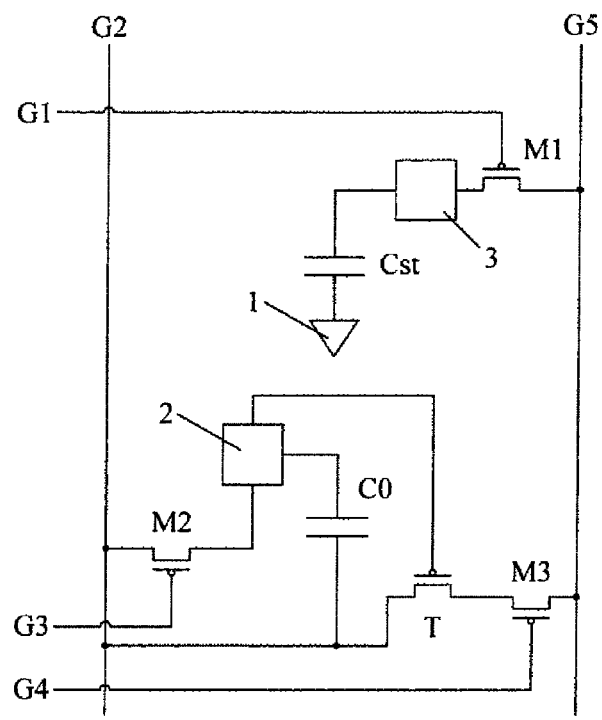
FIG. 4 is a schematic diagram of a touch-control pixel driving circuit as shown in FIG. 1.

For instance, as illustrated in FIGS. 2 and 3, the pixel electrode 3 is a slit electrode; in each pixel, the transmissive common electrode 1 is a transparent plate electrode of a transmissive region and may be made of indium tin oxides (ITO); and the reflective common electrode 2 is a reflective plate electrode of a reflective region and may be made of a metal. The manufacturing process of the amplifying transistor T may be the same with that of other switching transistors, and the amplifying transistor T has the amplifying function according to different width-to-length (W/L) ratios of channels of the switching transistors. Moreover, the reflective common electrode 2 not only has the function of a common electrode but also is used as a detection electrode for touch control.

Figure 5:
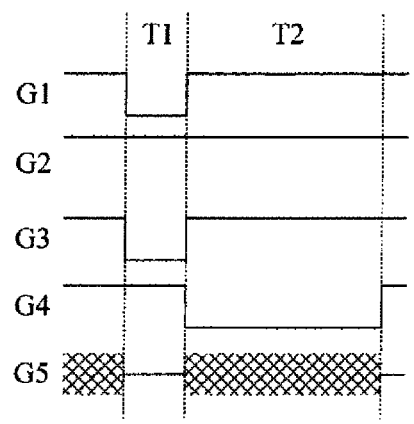
FIG. 5 is a sequence chart of the touch-control pixel driving circuit as shown in FIG. 4 within the time of one frame.

Further description will be given below to the foregoing touch-control pixel driving circuit through a touch-control pixel driving method. The touch-control pixel driving method is applied to the foregoing touch-control pixel driving circuit. As illustrated in FIG. 5, the driving process of one frame of each touch-control pixel may include the following two stages:

A first stage T1, in which the gate line G1 provides an ON signal to switch on the first switching transistor M1; the dual-purpose data line G5 provides a data signal to the pixel electrode 3 via the first switching transistor M1; the reset control line G3 provides an ON signal to switch on the second switching transistor M2; the reset signal line G2 provides a common electrode voltage to the reflective common electrode 2 via the second switching transistor M2; the read control line G4 provides an OFF signal to switch off the third switching transistor M3; and as both the transmissive common electrode 1 and the reflective common electrode 2 are at the common electrode voltage, a storage capacitor Cst is formed between the pixel electrode 3 and the transmissive common electrode 1 and the reflective common electrode 2 as well to control the deflection of liquid crystals and hence achieve the normal display function.

A second stage T2, in which the gate line G1 provides an OFF signal to switch off the first switching transistor M1; the reset control line G3 provides an OFF signal to switch off the second switching transistor M2; the read control line G4 provides an ON signal to switch on the third switching transistor M3; and as the amplifying transistor T is a P-type transistor and is switched on under a low voltage, when the reflective common electrode 2 detects finger touch, the voltage of the reflective common electrode 2 is reduced in such a way that the amplifying transistor T is switched on; and the common electrode voltage provided by the reset signal line G2 is amplified into a touch signal by the amplifying transistor T and provided to the dual-purpose data line G5 via the third switching transistor M3.

In the second stage T2, as the first switching transistor M1 is switched off and the voltage of the pixel electrode 3 is stored, in the case of no touch operation, the state of liquid crystals is maintained through the storage capacitor Cst between the pixel electrode 3 and the transmissive common electrode 1 and the reflective common electrode 2, and hence the normal display can be guaranteed; and at this point, the reflective common electrode 2 is used for providing the common electrode voltage. In the case of touch operation, a sensing capacitor is formed between a finger and the reflective common electrode 2 when the finger touches the surface of a screen, and hence the voltage of the reflective common electrode 2 is reduced. Therefore, the reflective common electrode 2 is used as the detection electrode, and the dual-purpose data line G5 is used as a read data line in this second stage T2. The X-axis coordinate of a touch position can be determined according to the fact that the dual-purpose data line G5 of which column reads the touch signal; the Y-axis coordinate of the touch position can be determined according to the fact that the read control line G4 of which row provides the ON signal; and hence the touch position can be determined. Moreover, an analog-to-digital (A/D) converter may be also disposed at a tail end of the dual-purpose data line G5 and is used for further determining the variation of the touch signal and hence determining that whether the position has been touched by a finger. After the driving time period of one frame of the touch-control pixel is ended, the next frame is carried out to repeat the above first stage T1 and the above second stage T2.

It should be noted that: the first switching transistor M1, the second switching transistor M2 and the third switching transistor M3 may be N-type transistors or P-type transistors. As for an N-type transistor, the ON signal is at a high level and the OFF signal is at a low level. As for a P-type transistor, the ON signal is at a low level and the OFF signal is at a high level. Moreover, the first switching transistor M1, the second switching transistor M2, the amplifying transistor T and the third switching transistor M3 may be thin-film transistors (TFT), in which a control end is a gate electrode; a first end of the P-type transistor is a source electrode and a second end of the P-type transistor is a drain electrode; and a first end of the N-type transistor is a drain electrode and a second end of the N-type transistor is a source electrode.

In the touch-control pixel driving circuit and the touch-control pixel driving method provided by the embodiments of the present invention, in the case of touch operation, the reflective common electrode is taken as the detection electrode to switch on the amplifying transistor and provide the touch signal, and a transflective structure is combined with the in-cell touch technology in the specific way. Therefore, the touch function can be achieved without the arrangement of additional driving electrodes and sensing electrodes, and hence the manufacturing process can be simplified, and consequently the costs can be reduced.

In one example, the first switching transistor M1, the second switching transistor M2, the amplifying transistor T and the third switching transistor M3 are manufactured by the low temperature polysilicon (LTPS) technology, so that the mobility of the transistors can be higher, and hence the transistors can be manufactured to have a smaller size, and consequently the aperture ratio can be improved. Moreover, the amplifying transistor T may have a higher breakdown voltage.

In the touch-control pixel driving circuit provided by the embodiment of the present invention, in the case of touch operation, the reflective common electrode is taken as the detection electrode to switch on the amplifying transistor and provide the touch signal, and a transflective structure is combined with the in-cell touch technology in a specific way. Therefore, the touch function can be achieved without the arrangement of additional driving electrodes and sensing electrodes, and hence the manufacturing process can be simplified, and consequently the costs can be reduced.

The embodiment of the present invention provides an array substrate adapted to a transflective display device, which comprises a plurality of pixel units arranged in a matrix: the pixel units are, for instance, defined by the gate lines G1 and the dual-purpose data lines G5 which are intersected with each other. As shown in the sectional view of FIG. 3, each pixel unit includes a pixel electrode 3 and includes a transmissive common electrode 1 and a reflective common electrode 2 which are disposed below the pixel electrode 3. Moreover, a plurality of the pixel units include display pixel units for achieving the normal display and touch-control pixel units for achieving the touch function, namely not every pixel unit must have the touch function; and each touch-control pixel unit includes the foregoing touch-control pixel driving circuit.

In the array substrate provided by the embodiment of the present invention, in the case of touch operation, the reflective common electrode is taken as the detection electrode to switch on the amplifying transistor and provide the touch signal, and a transflective structure is combined with the in-cell touch technology in a specific way. Therefore, the touch function can be achieved without the arrangement of additional driving electrodes and sensing electrodes, and hence the manufacturing process can be simplified, and consequently the costs can be reduced.

For instance, the pixel units may be divided into red pixels R, green pixels G and blue pixels B, and the touch-control pixel unit may be a blue pixel B. In order to achieve optimum visual effect, the dimensions of pixels of different colors may be different from each other; and the visual area of the blue pixel B is usually less than that of the green pixel G and that the red pixel R, and hence the aperture ratio cannot be reduced when additional touch-control elements are disposed in the blue pixel B.

For instance, as shown in the sectional view of FIG. 3, an example of the array substrate comprises a substrate 10, a first insulating layer (a gate insulating layer) 11 is disposed on the substrate 10; a reflective common electrode 2 is disposed on the first insulating layer 11; a second insulating layer (a passivation layer) 13 is disposed on the reflective common electrode 2; a transmissive common electrode 1 is disposed on the second insulating layer 13; a third insulating layer 15 is disposed on the transmissive common electrode 1; a pixel electrode 3 is disposed on the third insulating layer 15; and a fourth insulating layer 17 is also disposed above the pixel electrode 3 and, for instance, is used for adjusting the thickness of a liquid crystal layer on the array substrate. Moreover, a quarter-wave plate (QWP) 4 may be further disposed above the reflective common electrode 2 and is used for guaranteeing the consistency of the polarization direction of light in a reflecting area and a transmissive area when the light enters human eyes. The substrate 10 may be made of glass, plastic or the like. The pixel electrode 3 is connected with a source electrode or a drain electrode of the TFT M1.

It should be noted that: the number and the position of the touch-control pixel units can be set according to the touch resolution practically required. The structure and the working principle of the touch-control pixel driving circuit in the embodiment are the same with those of the above embodiment and will not be further described herein.

In the array substrate provided by the embodiment of the present invention, in the case of touch operation, the reflective common electrode is taken as the detection electrode to switch on the amplifying transistor and provide the touch signal, and a transflective structure is combined with the in-cell touch technology in a specific way. Therefore, the touch function can be achieved without the arrangement of additional driving electrodes and sensing electrodes, and hence the manufacturing process can be simplified, and consequently the costs can be reduced.

An embodiment of the present invention provides an LCD device, which comprises an opposing substrate and the foregoing array substrate, and the opposing substrate is, for instance, a color filter substrate.

The structure and the working principle of the array substrate in the embodiment are the same with those of the above embodiment and will not be further described herein.

In the LCD device provided by the embodiment of the present invention, in the case of touch operation, the reflective common electrode is taken as the detection electrode to switch on the amplifying transistor and provide the touch signal, and a transflective structure is combined with the in-cell touch technology in a specific way. Therefore, the touch function can be achieved without the arrangement of additional driving electrodes and sensing electrodes, and hence the manufacturing process can be simplified, and consequently the costs can be reduced.

The foregoing is only the preferred embodiments of the present invention and not intended to limit the scope of protection of the present invention. The scope of protection of the present invention should be defined by the appended claims.

The invention claimed is:

1. A touch-control pixel driving method applied to a touch-control pixel driving circuit, the touch-control pixel driving circuit comprising a pixel electrode, a transmissive common electrode, a reflective common electrode, a gate line, a reset signal line, a reset control line, a read control line, a dual-purpose data line, a first switching transistor, a second switching transistor, an amplifying transistor, a third switching transistor and a coupling capacitor, wherein a first end of the first switching transistor is connected to the pixel electrode; a second end of the first switching transistor is connected to the dual-purpose data line; a control end of the first switching transistor is connected to the gate line; a first end of the second switching transistor is connected to the reflective common electrode; a second end of the second switching transistor is connected to the reset signal line; a control end of the second switching transistor is connected to the reset control line; a first end of the amplifying transistor is connected to the reset signal line; a control end of the amplifying transistor is connected to the reflective common electrode; a first end of the third switching transistor is connected to a second end of the amplifying transistor; a second end of the third switching transistor is directly connected to the dual-purpose data line; a control end of the third switching transistor is directly connected to the read control line; both ends of the coupling capacitor are respectively connected to the reflective common electrode and the reset signal line; and the amplifying transistor is a P-type transistor, the touch-control pixel driving method comprising:

a first stage, in which the gate line provides an ON signal to switch on the first switching transistor; the dual-purpose data line provides a data signal to the pixel electrode via the first switching transistor; the reset control line provides an ON signal to switch on the second switching transistor; the reset signal line provides a common electrode voltage to the reflective common electrode via the second switching transistor; and the read control line provides an OFF signal to switch off the third switching transistor; and a second stage, in which the gate line provides an OFF signal to switch off the first switching transistor; the reset control line provides an OFF signal to switch off the second switching transistor; the read control line provides an ON signal to switch on the third switching transistor; and when the reflective common electrode detects finger touch, a voltage of the reflective common electrode is reduced in such a way that the amplifying transistor is switched on, and the common electrode voltage provided by the reset signal line is amplified into a touch signal by the amplifying transistor and provided to the dual-purpose data line via the third switching transistor.

* * * * *